April 30, 1929. W. L. WALL 1,710,680
OPHTHALMIC MOUNTING
Filed March 24, 1926
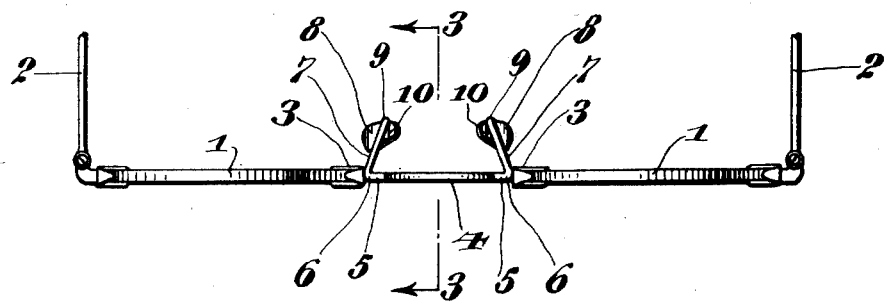
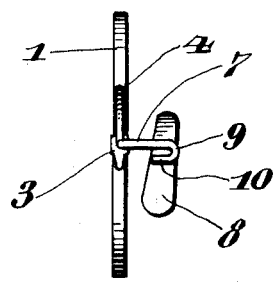 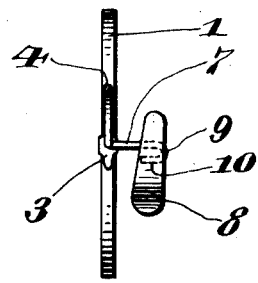
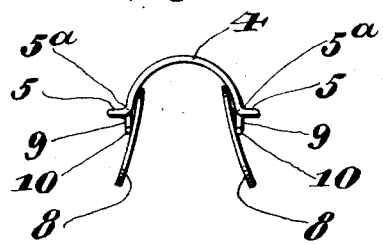
INVENTOR.
William L. Wall
BY
Cyrus N. Anderson
ATTORNEY.

Patented Apr. 30, 1929.

1,710,680

UNITED STATES PATENT OFFICE.

WILLIAM L. WALL, OF PHILADELPHIA, PENNSYLVANIA, ASSIGNOR TO WALL & OCHS, INCORPORATED, OF PHILADELPHIA, PENNSYLVANIA, A CORPORATION OF PENNSYLVANIA.

OPHTHALMIC MOUNTING.

Application filed March 24, 1926. Serial No. 96,911.

The present invention relates to ophthalmic mountings of the character of that shown in Letters Patent of the United States No. 1,360,603, granted November 30th, 1920. While the construction disclosed in that patent possesses many features of practical advantage, yet it has been found to be desirable to provide a structure of a character such that adjustment thereof, when necessary, may be more readily and efficiently made.

One object of the present invention, therefore, is to provide an ophthalmic mounting of the character of that disclosed in said Letters Patent in which adjustment may be readily and efficiently made to adapt the same for use by persons having different facial conformations and in which the optical centers of the eyes are located at different distances from a plane medially located with respect to the nose.

It is also an object of the invention to provide a construction of the character indicated in which the rearwardly projecting arms which support the nose bearing portions of the mounting are integral with the outer ends of the posts which extend outwardly from the opposite ends of the intermediate arc-shaped or semi-circular portion of the bridge structure, which arms extend rearwardly from the point of connection of the said posts with the straps or rims, as the case may be, which hold the lenses of a pair of spectacles.

Another object of the invention is to provide a construction of ophthalmic mounting in which the posts which connect the opposite ends of the intermediate semi-circular portion of the bridge to the lens straps or rims may be altered in length so that one of them may be longer or shorter than the other, but without destroying the semi-circular character of the intermediate or central portion of the bridge structure.

A further object of the invention is to provide means whereby the nose bearing members may have a relatively wide range of adjustment.

In order that the invention may be readily understood and its practical advantages, as already indicated, fully appreciated reference may be had to the accompanying drawing in which I have illustrated one form of a convenient embodiment thereof. However, it will be understood that the invention may be embodied in other forms of construction than that shown and that changes in the details of construction may be made within the scope of the claims without departing from the said invention.

In the drawing:

Fig. 1 is a top plan view of a pair of spectacles provided with an ophthalmic mounting embodying the invention;

Fig. 2 is a view in end elevation of the said mounting;

Fig. 3 is a central sectional view taken on the line 3—3 of Fig. 1; and

Fig. 4 is a view in front elevation of the said mounting separated or disconnected from the lenses of the eyeglasses.

Referring to the drawing, it will be noted that I have illustrated the invention in connection with a pair of rimless spectacles comprising lenses 1 to the outer ends or edges of which temple wires or bars 2 are pivotally connected in known manner. The inner edges or ends of the lenses are provided with straps 3, also of known construction, and secured to the lenses in any known manner. The ophthalmic mounting constituting my invention is connected at its opposite ends by soldering or in any other suitable manner to the inner surfaces of the straps 3. The said mounting comprises an intermediate central semi-circular bridge portion 4 which terminates at its outer opposite ends in outwardly extending integral posts 5. The bridge is relatively rigid as it is not intended to be bent in placing the spectacles upon the nose nor to exert a spring action to retain the spectacles in place upon the nose. The posts 5 are connected to the opposite ends of the intermediate semi-circular bridge portion 4 by means of bends, as indicated at $5^a$. The wire of the mounting is bent at the outer ends of the posts 5, as is indicated at 6, and is extended rearwardly therefrom to form arms 7 upon which the nose bearing members 8 are mounted. The outer rear end portions of the said arms 7 are bent downwardly, as indicated at 9, and then forwardly and slightly inwardly, as indicated at 10. To the forwardly extending rear end portions 10 of the said arms the nose bearing members 8 are connected at about their middle points, as indicated in the drawing. Such connection may be effected by soldering or otherwise. Connection of the forwardly extending rear end portions 10 of the arms is made to the outer sides or surfaces of the nose bearing members 8.

The outer ends of the posts 5 are connected at the bends 6 to the inner sides of the straps 3, which support the lenses, by soldering or in any other manner which may be preferable. Such connection is made to the outer or convex sides of the said bends. It will be understood that in cases where the lenses are supported within or by rims the outer ends of the posts 5 will be connected directly to the inner sides or edges of the said rims. The forward ends of the arms 7 instead of being integral with the outer ends of the posts 5 may be connected to the supports for the lenses, that is, the straps or the rims as the case may be.

It will be noticed upon reference to Fig. 1 of the drawing that the arms 7 extend rearwardly and in convergent relation to each other, so that the point of connection of the forwardly extending end portions 10 to the nose bearing members 8 is practically in alinement with the point of connection between the posts 5 and the ends of the semicircular portion 4. By reason of this relationship it will be apparent that the arms 7 may be adjusted through a wide range in order to effect the desired fitting thereof to noses of different widths and shapes. It also will be apparent that by reason of the twisting of the portions of the wire at the bends 9 so that the forwardly extending end portions 10 extend inwardly and at angles with respect to the arms 7 the nose bearing members 8 are capable of being adjusted through wide ranges independently of adjustments of the arms themselves.

It will be seen that by my invention I am enabled to produce a construction in which provision is made for a maximum of adjustment of the nose bearing members 8.

As already indicated, the rearwardly extending arms for supporting the nose bearing members, the posts 5 and the intermediate semi-circular bridge portion 4 are integrally related in the construction as illustrated.

In commercial practice the mountings will be made with the semi-circular or curved bridge portions of graded or different sizes in order to provide for the fitting of noses of different sizes.

If it should happen that in the fitting of a pair of spectacles to the eyes of a person it should be found that the posts 5 at the opposite ends of a semi-circular or curved bridge portion of a size which should be used for such person are too short, the fitter may meet the requirement by taking a mounting having a curved bridge portion of larger size and by the use of pliers, work the opposite end portions of the curved bridge into the said posts, thereby reducing the curved bridge portion to the size required and at the same time lengthen the posts. On the other hand, if under the condition stated, the posts 5 should be too long, the difficulty or requirement may be met by a reverse operation; that is, a mounting having a curved bridge portion of smaller size may be taken and the inner end portions of the posts worked by the fitter into the curved portion, thereby increasing the size of the latter and at the same time shortening the posts.

In case it should be found that one of the posts 5 should be longer than the other in order to locate the lenses properly with respect to the eyes, then again a mounting should be taken having a semi-circular or curved bridge portion larger than required for the particular person and one end portion thereof worked into the post which should be longer, thereby producing a mounting with the respective posts of proper length and a curved bridge portion of the requisite size.

It will be understood that in constructions embodying my invention it is not intended that the semi-circular intermediate portion 4 of the bridge shall rest upon the nose, but on the contrary there is and should be a space between the said semi-circular bridge portion and the nose. The glasses are supported upon the nose by the nose bearing members 8 which rest upon the nose at opposite sides thereof.

By my invention I am enabled to provide a construction of a character to afford a maximum of adjustment and which wearers have found to be extremely comfortable. A construction embodying my invention also is desirable from the standpoint of neatness of appearance.

Having thus described my invention, what I claim and desire to secure by Letters Patent is:

1. An ophthalmic mounting for spectacles comprising an intermediate arc-shaped rigid and non-spring-acting bridge portion terminating at its opposite ends in outwardly extending posts, the outer ends of which are connected to the supports for the lenses of the spectacles, and arms extending rearwardly from the outer ends of said posts at their points of connection to said supports, the rear ends of which arms are adapted to support nose bearing members.

2. An ophthalmic mounting for spectacles comprising an intermediate arc-shaped rigid and non-spring-acting portion having integral outwardly extending posts at its opposite ends, the outer ends of which are adapted to be connected to the supports for the lenses of spectacles, arms integral with the outer ends of said posts and extending rearwardly therefrom, the said arms terminating in portions which extend downwardly and forwardly toward the plane of the lenses, and nose bearing members connected to the said forwardly extending portions.

3. An ophthalmic mounting comprising an intermediate rigid and non-spring-acting semi-circular portion which terminates at its opposite ends in integral outwardly extending portions constituting posts, means for connecting the outer ends of said posts to lenses of spectacles for supporting the same, arms having integral connection with the outer ends of said posts, which arms extend rearwardly from the plane of the lenses and are adjustable toward and from each other, and nose bearing members mounted upon the rear end portions of said arms.

4. An ophthalmic mounting for spectacles comprising an intermediate semi-circular portion, the opposite ends of which terminate in integral outwardly extending projections, means for connecting the outer ends of said projections to the lenses of spectacles, arms extending rearwardly from the outer ends of said projections, the rear end portions of said arms being extended downwardly and forwardly with respect to the rearwardly extending portions of said arms, and nose bearing members mounted upon said forwardly extending portions.

5. An ophthalmic mounting for spectacles comprising a wire having an intermediate relatively rigid portion of semi-circular shape, portions extending outwardly from the opposite ends of said semi-circular portion constituting posts, means for connecting the outer ends of said posts to the lenses of a pair of spectacles, the said wire at the outer ends of said posts being bent and extended rearwardly from the plane of the lenses to form arms, the rear end portions of which arms extend laterally with respect to the front portions thereof, and nose bearing members mounted upon the said rear end portions of said arms.

6. An ophthalmic mounting comprising wire having an intermediate semi-circular portion and also having portions extended outwardly from the opposite ends of the semi-circular portion constituting posts, means for connecting the outer ends of the said posts to the lenses of a pair of spectacles, the said wire at the outer ends of said posts being extended rearwardly and inwardly in convergent relation with respect to each other to form arms, the rear end portions of said arms being bent downwardly and then forwardly and inwardly with respect to the front portions of said arms, and nose bearing members connected at points about their middles to the forwardly extending portions of said arms.

7. An ophthalmic mounting for spectacles comprising lenses and supports therefor, a rigid and non-spring-acting bridge connected at its opposite ends to said supports, arms connected at their forward ends to said supports and extending rearwardly therefrom and from the plane of the said lenses, the rear end portions of which arms extend downwardly and forwardly toward the plane of said lenses, and nose bearing members connected to the said forwardly extending portions.

8. An ophthalmic mounting for spectacles, comprising means in engagement with the edges of the lenses for supporting the same, a rigid and non-spring-acting bridge having connection at its opposite ends with said lens supporting means, and arms extending rearwardly from the said supporting means and from the plane of the lenses, the rear end portions of which arms extend laterally and forwardly with respect to the front portions thereof, and nose bearing members mounted upon the forwardly extending parts of said rear end portions.

9. An ophthalmic mounting for spectacles comprising an intermediate semi-circular portion the opposite ends of which terminate in integral outwardly extending projections, means for connecting the outer ends of said projections to the lenses of spectacles, arms extending rearwardly from the outer ends of said projections, the rear end portions of said arms extending laterally with respect to the front portions thereof, said rear end portions of said arms terminating in downwardly and forwardly extending portions, the last named portions being positioned laterally with respect to the upper rear end portions of said arms, and nose-bearing members mounted upon said downwardly and forwardly extending portions of the said arms.

In testimony that I claim the foregoing as my invention, I have hereunto signed my name this 23rd day of March, A. D. 1926.

WILLIAM L. WALL.